US012465545B2

(12) United States Patent
Nagasue et al.

(10) Patent No.: US 12,465,545 B2
(45) Date of Patent: Nov. 11, 2025

(54) WALKING TRAINING SYSTEM, CONTROL METHOD THEREOF, AND CONTROL PROGRAM

(71) Applicant: TOYOTA JIDOSHA KABUSHIKI KAISHA, Toyota (JP)

(72) Inventors: Junichi Nagasue, Nagakute (JP); Takuma Nakamura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 845 days.

(21) Appl. No.: 17/659,000

(22) Filed: Apr. 12, 2022

(65) Prior Publication Data

US 2022/0331192 A1 Oct. 20, 2022

(30) Foreign Application Priority Data

Apr. 14, 2021 (JP) ................................ 2021-068349

(51) Int. Cl.
*A61H 3/00* (2006.01)
*A61H 1/02* (2006.01)
*A63B 22/02* (2006.01)

(52) U.S. Cl.
CPC ........... *A61H 3/008* (2013.01); *A61H 1/0262* (2013.01); *A63B 22/02* (2013.01); (Continued)

(58) Field of Classification Search
CPC ........ A61H 2003/001; A61H 2003/002; A61H 2003/005; A61H 3/00; A61H 3/008; A61H 1/0237; A61H 1/024; A61H 1/0262; A61H 1/0266; A61H 1/0244; A61H 1/0255; A61H 1/0259; A61H 2001/0248; A61H 2001/0251; B25J 9/0006
See application file for complete search history.

(56) References Cited

U.S. PATENT DOCUMENTS

2013/0000156 A1 1/2013 Andoh
2013/0150980 A1* 6/2013 Swift ........................ A61F 2/70 623/24

(Continued)

FOREIGN PATENT DOCUMENTS

CN 106466219 A 3/2017
JP 2013075044 A 4/2013

(Continued)

*Primary Examiner* — Victoria Murphy
*Assistant Examiner* — Kelsey Rhee
(74) *Attorney, Agent, or Firm* — Dickinson Wright, PLLC

(57) ABSTRACT

The walking training device includes: a robot leg attached to one leg of a trainee; a treadmill; a load distribution sensor that detects a distribution of a load received from a sole of the trainee; and a walking state distinguishing unit that determines whether the one leg is in a swinging leg state; a control unit that performs a predetermined bending-extending control for the swinging leg state of the one leg by the robot leg when the one leg is in the swinging leg state; a measuring unit that measures a clearance between the one leg in the swinging leg state and the treadmill. The control unit changes control content of the predetermined bending-extending control so that the one leg does not contact the belt of the treadmill during extending control of the one leg, when the clearance is less than a specified value.

13 Claims, 10 Drawing Sheets

(52) U.S. Cl.
CPC .................. *A61H 2201/164* (2013.01); *A61H 2201/1642* (2013.01); *A61H 2201/165* (2013.01); *A61H 2201/1652* (2013.01); *A61H 2201/5025* (2013.01); *A61H 2201/5061* (2013.01); *A61H 2201/5064* (2013.01); *A61H 2201/5092* (2013.01)

(56) References Cited

U.S. PATENT DOCUMENTS

| | | | | |
|---|---|---|---|---|
| 2016/0045386 | A1* | 2/2016 | Sandler ................ | A61B 5/7455 623/24 |
| 2017/0049660 | A1* | 2/2017 | Sugata ................. | A61B 5/1038 |
| 2017/0202724 | A1 | 7/2017 | De Rossi et al. | |
| 2019/0216669 | A1* | 7/2019 | Fukunaga ........ | A63B 21/00181 |
| 2021/0000677 | A1 | 1/2021 | Otsuki et al. | |
| 2023/0310249 | A1* | 10/2023 | Paik ..................... | A61H 1/0266 482/4 |
| 2024/0148522 | A1* | 5/2024 | Farris ........................ | A61F 2/70 |

FOREIGN PATENT DOCUMENTS

| | | | | |
|---|---|---|---|---|
| JP | 2016-073525 A | | 5/2016 | |
| JP | 2021009565 A | | 1/2021 | |
| WO | WO-2022006384 A1 | * | 1/2022 | ............. A61H 1/024 |

* cited by examiner

WALKING TRAINING SYSTEM, CONTROL METHOD THEREOF, AND CONTROL PROGRAM

CROSS-REFERENCE TO RELATED APPLICATION

This application claims priority to Japanese Patent Application No. 2021-068349 filed on Apr. 14, 2021, incorporated herein by reference in its entirety.

BACKGROUND

1. Technical Field

The present disclosure relates to a walking training system, a control method thereof, and a control program.

2. Description of Related Art

Japanese Unexamined Patent Application Publication No. 2016-73525 (JP 2016-73525 A) discloses a walking training system including a dynamic balance ability evaluation device for evaluating a dynamic balance ability of a user based on a time variation of a predetermined body part due to the user walking, and a treadmill for performing the above walking training. Here, JP 2016-73525 A describes that a pressure sensor is provided on a belt of the treadmill and a floor reaction force is acquired from a measured value of the pressure sensor.

SUMMARY

In the related technology, the position (height) of each leg of the user (trainee) during walking training while the leg is swinging is not monitored. Thus, in the related technology, when the bending and extension of the affected leg is controlled (assisted) by the walking assist device (robot leg), for example, even when the height of the affected leg while the leg is swinging is lower than expected, the bending and extending control of the affected leg is performed by the walking assist device without considering the above. In this case, the user may stumble on the belt during extending control of the walking assist device, for example. That is, there is a problem that the related technology cannot provide effective training to the user.

The present disclosure has been made in view of the above background, and an object of the present disclosure is to provide a walking training system capable of providing effective training to a trainee, a control method thereof, and a control program.

A walking training system according to an embodiment of the present disclosure includes: a robot leg attached to one leg of a trainee; a treadmill; a load distribution sensor that detects a distribution of a load received from a sole of the trainee riding on a belt of the treadmill; a walking state distinguishing unit that determines whether at least the one leg is in a standing leg state or a swinging leg state, based on a detected result by the load distribution sensor; a control unit that performs a predetermined bending-extending control for the swinging leg state of the one leg by the robot leg when the walking state distinguishing unit determines that the one leg is in the swinging leg state; and a measuring unit that measures a clearance between the one leg in the swinging leg state and the treadmill, in which when the clearance measured by the measuring unit is less than a specified value, the control unit changes control content of the predetermined bending-extending control by the robot leg such that the one leg does not contact the belt of the treadmill during extending control of the one leg by the robot leg. This walking training system can provide effective training for the trainee because it can make the trainee walk without stumbling on the belt of the treadmill even when the height of one leg to which the robot leg attached in the swinging leg state is low.

When the clearance measured by the measuring unit is less than the specified value, the control unit may delay the start of the extending control of the one leg by the robot leg.

When the clearance measured by the measuring unit is less than the specified value, the control unit may raise the robot leg such that the clearance is equal to or more than the specified value.

The measuring unit may measure the clearance from a captured image of a photographing device that photographs the trainee during walking training.

The measuring unit may measure the clearance based on at least one of a length of a wire and a tension of the wire when a leg relief device that assists an operation of the robot leg pulls the robot leg using the wire.

The measuring unit may be a laser displacement meter that measures the clearance using a laser.

The measuring unit may be an ultrasonic sensor that measures the clearance using ultrasonic waves.

A control method of a walking training system according to an embodiment of the present disclosure includes: a step of detecting a distribution of a load received from a sole of a trainee riding on a belt of a treadmill by using a load distribution sensor; a step of determining whether at least one leg to which a robot leg is attached is in a standing leg state or a swinging leg state, based on a detected result by the load distribution sensor; a step of performing a predetermined bending-extending control for the swinging leg state of the one leg by the robot leg when it is determined that the one leg is in the swinging leg state; a step of measuring a clearance between the one leg in the swinging leg state and the treadmill; and a step of changing control content of the predetermined bending-extending control by the robot leg such that the one leg does not contact the belt of the treadmill during extending control of the one leg by the robot leg, when the clearance is less than a specified value. This control method of the walking training system can provide effective training for the trainee because it can make the trainee walk without stumbling on the belt of the treadmill even when the height of one leg to which the robot leg attached in the swinging leg state is low.

A control program according to one embodiment of the present disclosure causes a computer to execute: a process of detecting a distribution of a load received from a sole of a trainee riding on a belt of a treadmill by using a load distribution sensor; a process of determining whether at least one leg to which a robot leg is attached is in a standing leg state or a swinging leg state, based on a detected result by the load distribution sensor; a process of performing a predetermined bending-extending control for the swinging leg state of the one leg by the robot leg when it is determined that the one leg is in the swinging leg state; a process of measuring a clearance between the one leg in the swinging leg state and the treadmill; and a process of changing control content of the predetermined bending-extending control by the robot leg such that the one leg does not contact the belt of the treadmill during extending control of the one leg by the robot leg, when the clearance is less than a specified value. This control program can provide effective training for the trainee because it can make the trainee walk without stumbling on the belt of the treadmill even when the height of one leg to which the robot leg attached in the swinging leg state is low.

Accordance with the present disclosure, it is possible to provide a walking training system capable of providing effective training to a trainee, a control method thereof, and a control program.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, the present disclosure will be described through an embodiment, but the present disclosure in accordance with the scope of the claims is not limited to the following embodiment. Moreover, not all of the configurations described in the embodiment are indispensable as means for solving the problem. For the sake of clarity, the following description and drawings have been omitted and simplified as appropriate. In each drawing, the same elements are designated by the same reference signs, and duplicate descriptions are omitted as necessary.

First Embodiment

Figure 1:
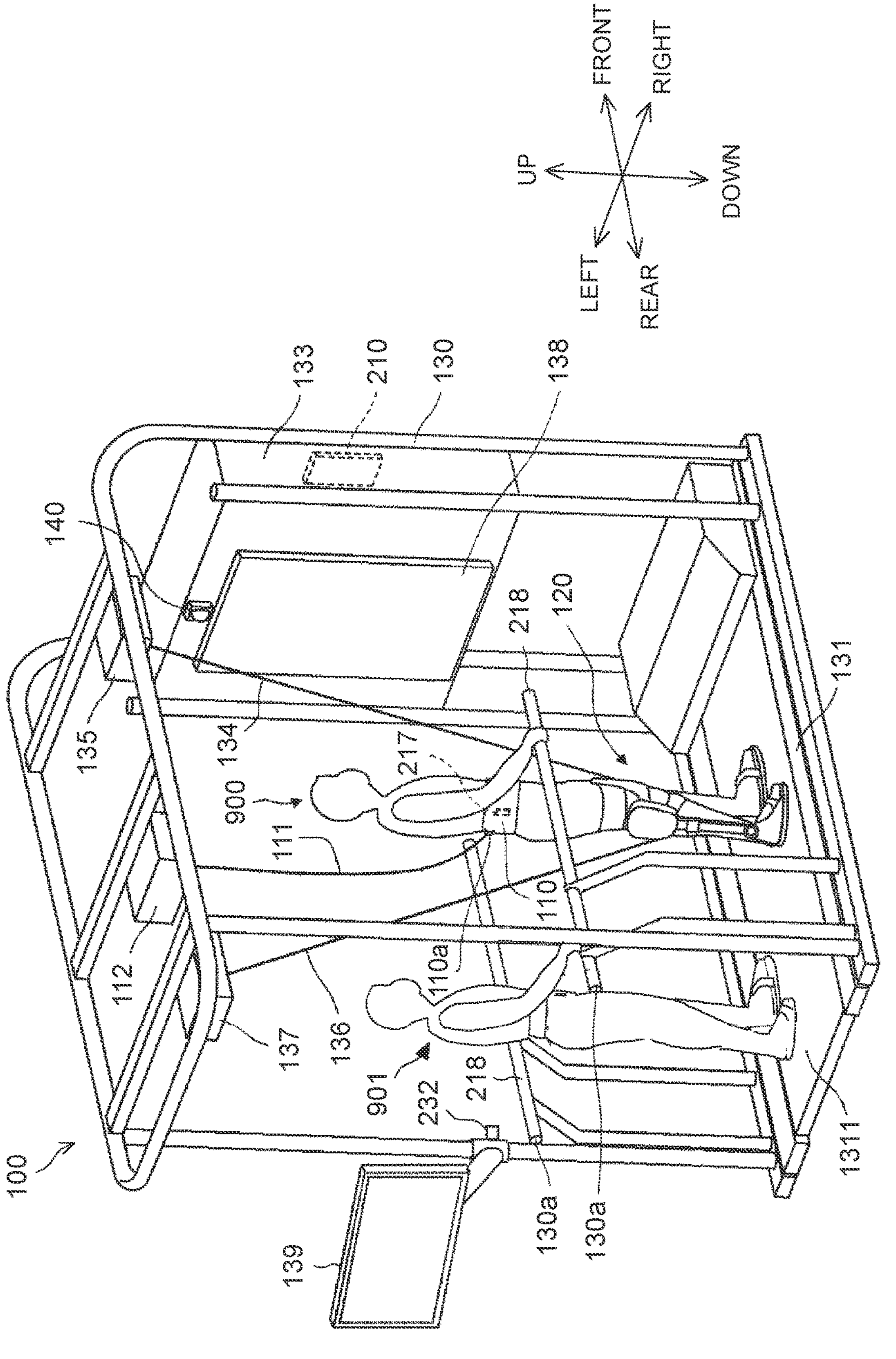
FIG. 1 is an overall conceptual diagram showing a configuration example of a walking training device in accordance with a first embodiment.

FIG. 1 is an overall conceptual diagram showing a configuration example of a walking training device in accordance with a first embodiment. A walking training device 100 according to the present embodiment is a specific example of a rehabilitation support device that supports the rehab (rehabilitation) of a trainee (user) 900, and is particularly a specific example of a walking training device that supports walking training. The walking training device 100 is a device for a trainee 900, who is a hemiplegic patient suffering from paralysis in one leg, to perform walking training in accordance with the guidance of a training staff 901. Here, the training staff 901 can be, for example, a therapist (physiotherapist) or a doctor, and may be called a training instructor, a training caregiver, or a training assistant, since the training of the trainee is assisted by guidance or caregiving. The walking training device 100 can also be called a walking training system. The vertical direction, the horizontal direction, and the front-back direction in the following description are directions based on the direction of the trainee 900.

The walking training device 100 mainly includes a control panel 133 attached to a frame 130 forming the entire skeleton, a treadmill 131 on which the trainee 900 walks, and a walking assist device (robot leg) 120 attached to an affected leg that is a leg portion on a paralyzed side of the trainee 900.

The treadmill 131 is a device that encourages the trainee 900 to walk, and the trainee 900 who performs walking training rides on a belt 1311 and attempts a walking motion in accordance with the movement of the belt 1311. As shown in FIG. 1, the training staff 901 can stand on the belt 1311 behind the trainee 900 and walk together with the trainee 900. However, usually, it is preferable that the training staff 901 be in a state in which it is easier to perform caregiving to the trainee 900 such as standing over the belt 1311.

Figure 2:
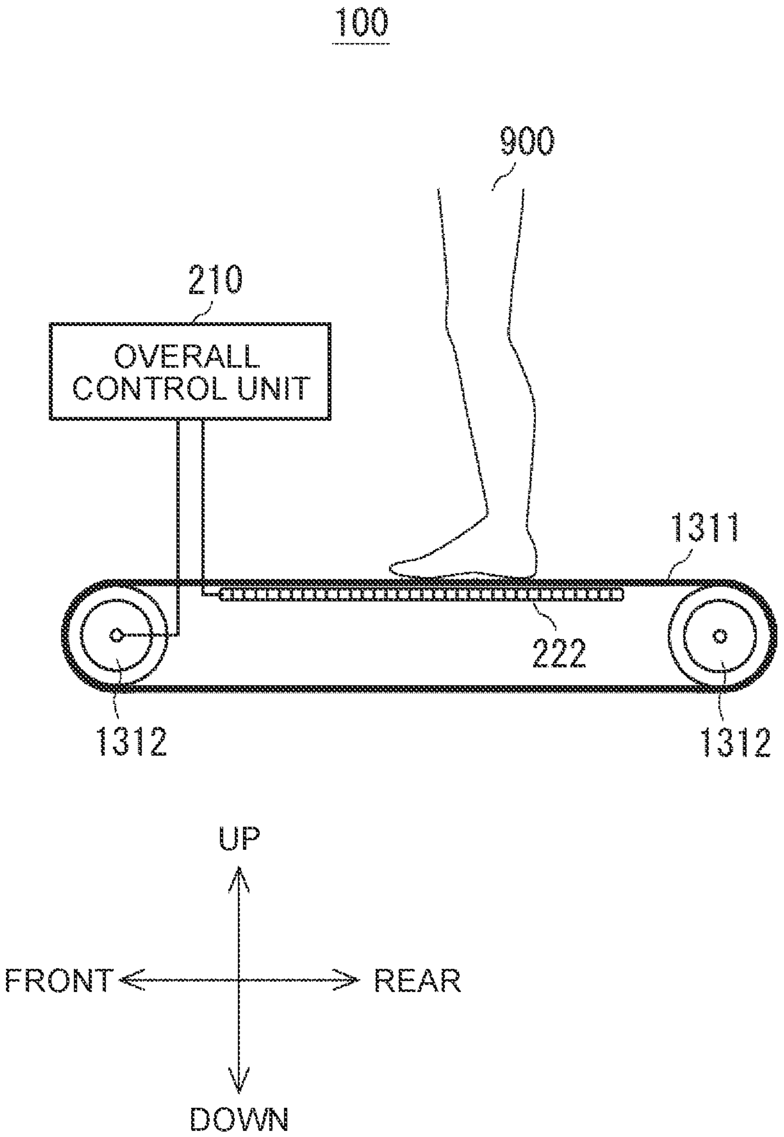
FIG. 2 is a schematic side view of a part of a treadmill provided in the walking training device shown in FIG. 1.

FIG. 2 is a schematic side view of a part of the treadmill 131. As shown in FIG. 2, the treadmill 131 includes at least the ring-shaped belt 1311, a pulley 1312, and a motor (not shown). Further, a load distribution sensor 222 is installed on the inner side of the belt 1311 (a lower side of the belt 1311 on the surface on which the trainee 900 is boarded) so as not to be interlocked with the belt 1311. However, the load distribution sensor 222 may be provided on the upper side of the belt 1311 so as to be interlocked with the belt 1311.

The load distribution sensor 222 is composed of a plurality of sensors, and these sensors are arranged in a matrix under the belt 1311 that supports the sole of the trainee 900. By using these sensors, the load distribution sensor 222 can detect the magnitude and distribution of the surface pressure (load) received from the sole of the trainee 900. For example, the load distribution sensor 222 is a resistance change detection type load detection sheet in which a plurality of electrodes is arranged in a matrix. From the detected result of the load distribution sensor 222, it is possible to distinguish the walking state of the trainee 900 (whether each leg is in a standing leg state or a swinging leg state, and the like).

In the present embodiment, the case where the load distribution sensor 222 is provided on the treadmill 131 side is described as an example. However, the present disclosure is not limited to this. The load distribution sensor 222 may be attached to, for example, the sole portion of the walking assist device 120, and may detect the magnitude and distribution of the surface pressure (load) received from the sole of the affected leg to which the walking assist device 120 is attached. In this case, at least the walking state of the affected leg to which the walking assist device 120 is attached can be distinguished, by the detected result of the load distribution sensor 222.

In the treadmill 131, for example, an overall control unit 210, which will be described later, distinguishes the walking state of the trainee 900 based on the detected result of the load distribution sensor 222, and uses a motor (not shown) to rotate the pulley 1312 in accordance with the walking state and rotates (moves) the ring-shaped belt 1311. As a result, the trainee 900 can perform walking training without protruding from the belt 1311.

The frame 130 stands on the treadmill 131 installed on the floor surface, and supports the control panel 133 that houses the overall control unit 210 that controls the motor and the sensor, and supports a training monitor 138 that is a liquid crystal panel that present the training progress and the like to the trainee 900. Further, the frame 130 supports a front tension portion 135 near the front of the overhead portion of the trainee 900, a harness tension portion 112 near the overhead portion, and a rear tension portion 137 near the rear of overhead portion. The frame 130 also includes handrails 130*a* for the trainee 900 to grab.

The handrails 130*a* are arranged on both left and right sides of the trainee 900. Each handrail 130*a* is arranged in a direction parallel to the walking direction of the trainee 900. The vertical position and the horizontal position of the handrail 130*a* can be adjusted. That is, the handrail 130*a* can include a mechanism for changing its height and width. Further, the handrail 130*a* can be configured so that the inclination angle thereof can be changed by adjusting the height of the handrail 130*a* so that the height of the front side and the height of the rear side in the walking direction are different, for example. For example, the handrail 130*a* can be provided with an inclination angle that gradually increases along the walking direction.

Further, the handrail 130*a* is provided with a handrail sensor 218 for detecting the load received from the trainee 900. For example, the handrail sensor 218 can be a resistance change detection type load detection sheet in which electrodes are arranged in a matrix. Further, the handrail sensor 218 can be a 6-axis sensor in which a 3-axis acceleration sensor (x, y, z) and a 3-axis gyro sensor (roll, pitch, yaw) are combined. However, the type and installation position of the handrail sensor 218 are not limited.

A camera 140 functions as a capturing unit for observing the whole body of the trainee 900. The camera 140 is installed near the training monitor 138 so as to face the trainee. The camera 140 captures still images and moving images of the trainee 900 during training. The camera 140 includes a set of a lens and a capturing element so that the angle of view is such that the whole body of the trainee 900 can be captured. The image sensor is, for example, a complementary metal-oxide-semiconductor (CMOS) image sensor that converts an optical image formed on an image plane into an image signal.

With the coordinated operation of the front tension portion 135 and the rear tension portion 137, the load of the walking assist device 120 is offset so as not to be a burden on the affected leg, and further, the swinging out operation of the affected leg is assisted in accordance with the degree of the setting.

One end of a front wire 134 is connected to a winding mechanism of the front tension portion 135, and the other end is connected to the walking assist device 120. The winding mechanism of the front tension portion 135 winds and unwinds the front wire 134 in accordance with the movement of the affected leg by turning on and off a motor (not shown). Similarly, one end of a rear wire 136 is connected to a winding mechanism of the rear tension portion 137, and the other end is connected to the walking assist device 120. The winding mechanism of the rear tension portion 137 winds and unwinds the rear wire 136 in accordance with the movement of the affected leg by turning on and off a motor (not shown). With such a coordinated operation of the front tension portion 135 and the rear tension portion 137, the load of the walking assist device 120 is offset so as not to be a burden on the affected leg, and further, the swinging out operation of the affected leg is assisted in accordance with the degree of the setting.

For example, as an operator, the training staff 901 sets a high level of assistance for a trainee who has severe paralysis. When the assist level is set to a high level, the front tension portion 135 winds the front wire 134 with a relatively large force in accordance with the swing timing of the affected leg. As the training progresses and assistance becomes no longer needed, the training staff 901 sets the assist level to the minimum level. When the assist level is set to the minimum, the front tension portion 135 winds the front wire 134 with a force sufficient to cancel the own weight of the walking assist device 120 in accordance with the swing timing of the affected leg.

The walking training device 100 further includes a fall prevention harness device composed of a brace 110, a harness wire 111, and a harness tension portion 112.

The brace 110 is a belt wrapped around the abdomen of the trainee 900 and is fixed to the waist portion by, for example, a hook-and-loop fastener. The brace 110 includes a connecting hook 110*a* for connecting one end of the harness wire 111 that is a hanger, and can also be referred to as a hanger belt. The trainee 900 wears the brace 110 so that the connecting hook 110*a* is located on the rear back portion.

One end of the harness wire 111 is connected to the connecting hook 110*a* of the brace 110, and the other end is connected to the winding mechanism of the harness tension portion 112. The winding mechanism of the harness tension portion 112 winds and unwinds the harness wire 111 by turning on and off a motor (not shown). With such a configuration, when the trainee 900 is about to fall, the fall prevention harness device winds up the harness wire 111 following the instruction of the overall control unit 210 that detects the movement, supports the upper body of the trainee 900 with the brace 110, and prevents the trainee 900 from falling.

The brace 110 includes a posture sensor 217 for detecting the posture of the trainee 900. The posture sensor 217 is, for example, a combination of a gyro sensor and an acceleration sensor, and outputs an inclination angle of the abdomen on which the brace 110 is attached in the direction of gravity.

The management monitor 139 is a display input device mainly for monitoring and operation by the training staff 901, and is attached to the frame 130. The management monitor 139 is, for example, a liquid crystal panel, and a touch panel is provided on the surface thereof. The management monitor 139 displays various menu items related to training settings, various parameter values at the time of training, training results, and the like. Further, an emergency stop button 232 is provided near the management monitor 139. When the training staff 901 presses the emergency stop button 232, an emergency stop of the walking training device 100 is performed.

The walking assist device 120 is attached to the affected leg of the trainee 900 and assists the trainee 900 in walking by reducing the load of extension and bending at the knee joint of the affected leg. The walking assist device 120 transmits data on the leg movement acquired by walking training to the overall control unit 210, or drives the joint portion in accordance with the instruction from the overall control unit 210. The walking assist device 120 can also be connected to a hip joint (a connecting member having a rotating portion) attached to the brace 110 that is a part of the transfer prevention harness device via a wire or the like.

Details of Walking Assist Device 120

Figure 3:
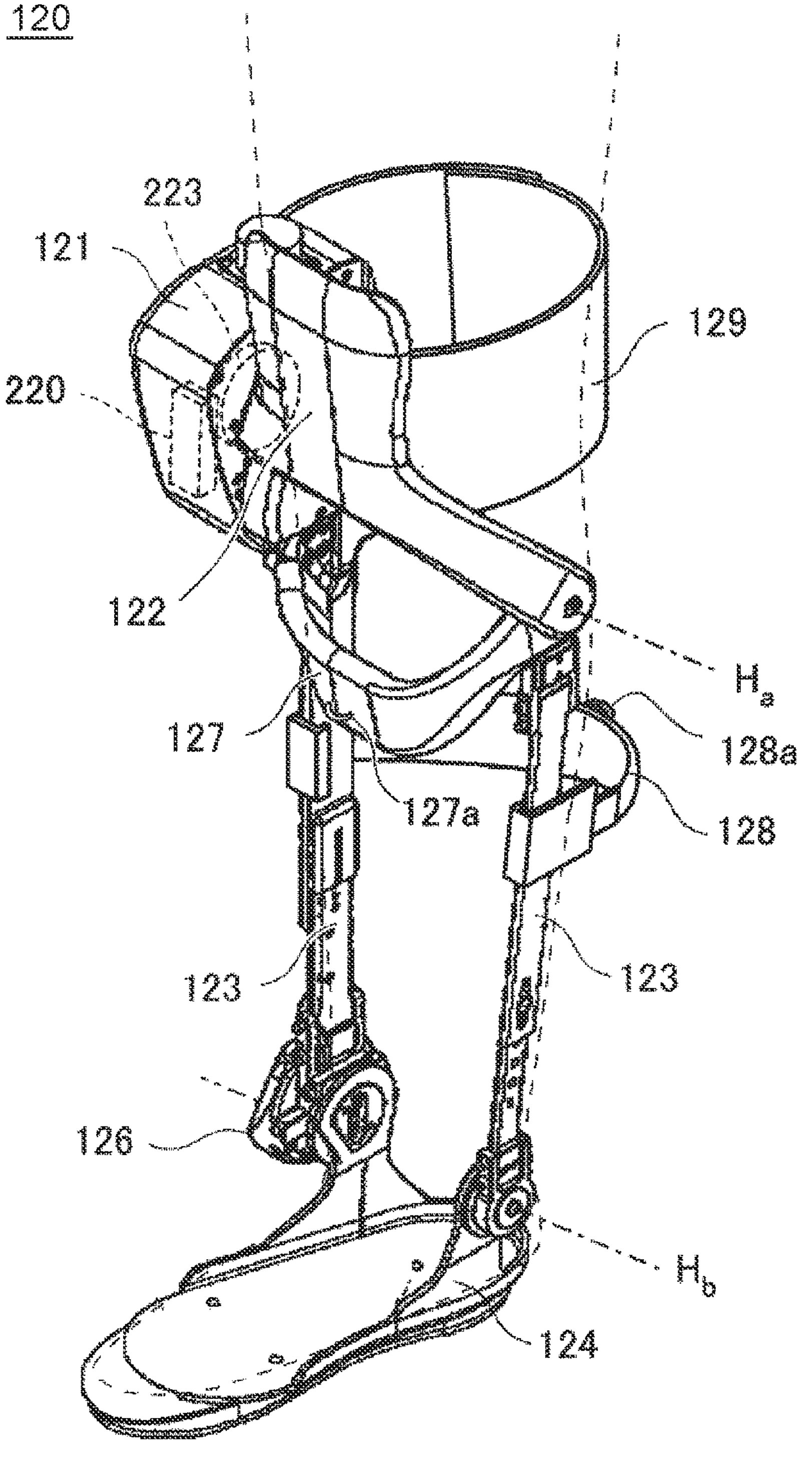
FIG. 3 is a schematic perspective view showing a configuration example of a walking assist device provided in the walking training device shown in FIG. 1.

FIG. 3 is a schematic perspective view showing a configuration example of the walking assist device 120. The walking assist device 120 mainly includes a control unit 121 and a plurality of frames that support each part of the affected leg. The walking assist device 120 is also referred to as a leg robot.

The control unit 121 includes an auxiliary control unit 220 that controls the walking assist device 120, and also includes a motor (not shown) that generates a driving force for assisting the extension movement and the bending movement of the knee joint. The frame that supports each part of the affected leg includes an upper leg frame 122 and a lower leg frame 123 that is rotatably connected to the upper leg frame 122. Further, this frame includes a foot flat frame 124 rotatably connected to the lower leg frame 123, a front connecting frame 127 for connecting the front wire 134, and a rear connecting frame 128 for connecting the rear wire 136.

The upper leg frame 122 and the lower leg frame 123 rotate relative to each other around a hinge axis Ha shown in the figure. The motor of the control unit 121 rotates in accordance with the instruction of the auxiliary control unit 220 to force the upper leg frame 122 and the lower leg frame 123 to relatively open or close around the hinge axis Ha. The angle sensor 223 housed in the control unit 121 is, for example, a rotary encoder, and detects the angle formed by the upper leg frame 122 and the lower leg frame 123 around the hinge axis Ha. The lower leg frame 123 and the foot flat frame 124 rotate relative to each other around the hinge axis Hb shown in the figure. The relative rotating angle range is pre-adjusted by an adjusting mechanism 126.

The front connecting frame 127 is provided so as to extend the front side of the upper leg in the horizontal direction and connect to the upper leg frame 122 at both ends. Further, the front connecting frame 127 is provided with a connecting hook 127*a* for connecting the front wire 134, near the center in the horizontal direction. The rear connecting frame 128 is provided so as to extend the rear side of the lower leg in the horizontal direction and connect to the lower leg frame 123 extending vertically at both ends. Further, the rear connecting frame 128 is provided with a connecting hook 128*a* for connecting the rear wire 136, near the center in the horizontal direction.

The upper leg frame 122 includes an upper leg belt 129. The upper leg belt 129 is a belt integrally provided on the upper leg frame, and is wrapped around the upper leg portion of the affected leg to fix the upper leg frame 122 to the upper leg portion. This prevents the entire walking assist device 120 from shifting with respect to the legs of the trainee 900.

(Example of System Configuration of Walking Training Device 100)

Figure 4:
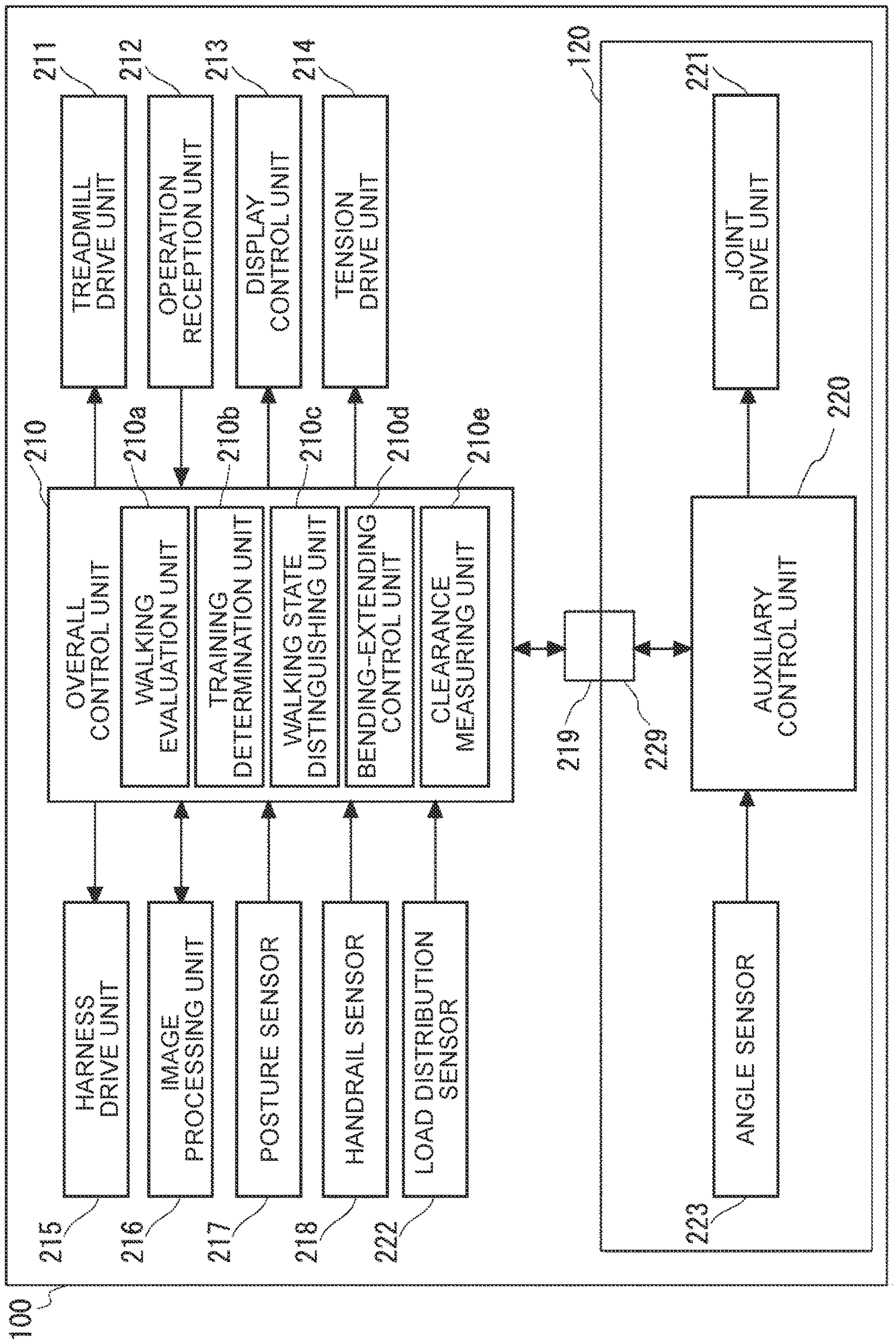
FIG. 4 is a block diagram showing a system configuration example of the walking training device shown in FIG. 1.

Subsequently, a system configuration example of the walking training device 100 will be described with reference to FIG. 4. FIG. 4 is a block diagram showing the system configuration example of the walking training device 100.

As shown in FIG. 4, the system configuration of the walking training device 100 includes the overall control unit 210, a treadmill drive unit 211, an operation reception unit 212, a display control unit 213, a harness drive unit 215, an image processing unit 216, the posture sensor 217, the handrail sensor 218, the load distribution sensor 222, a communication connection interface (IF) 219, and the walking assist device 120.

The overall control unit 210 is, for example, a micro processing unit (MPU), and executes control of the entire device by executing a control program read from a system memory.

The treadmill drive unit 211 includes a motor and a drive circuit thereof for rotating the belt 1311 of the treadmill 131. The overall control unit 210 executes rotation control of the belt 1311 by sending a drive signal to the treadmill drive unit 211. The overall control unit 210 adjusts the rotation speed of the belt 1311 in accordance with, for example, the walking speed set by the training staff 901. Alternatively, the overall control unit 210 adjusts the rotation speed of the belt 1311 in accordance with the walking state of the trainee 900 distinguished from the detected result of the load distribution sensor 222.

The operation reception unit 212 receives an input operation by the training staff 901 via an operation button provided on the device, a touch panel superimposed on the management monitor 139, an attached remote controller, or the like. The operation signal received by the operation reception unit 212 is transmitted to the overall control unit 210. The overall control unit 210 can give the instruction to switch the power on and off or give the instruction to start training based on the operation signal received by the operation reception unit 212. In addition, it is possible to input numerical values related to settings and select menu items. The operation reception unit 212 is not limited to the case where the input operation of the training staff 901 is accepted, and of course, the operation reception unit 212 can also accept the input operation of the trainee 900.

The display control unit 213 receives a display signal from the overall control unit 210, generates a display image, and displays it on the training monitor 138 or the management monitor 139. The display control unit 213 generates an image showing the progress of training and a real-time image taken by the camera 140 in accordance with the display signal.

The tension drive unit 214 includes a motor and a drive circuit thereof that are for pulling the front wire 134 and that are provided in the front tension portion 135, and a motor and a driver circuit thereof that are for pulling the rear wire 136 and that are provided in the rear tension portion 137. The overall control unit 210 controls the winding of the front wire 134 and the winding of the rear wire 136 by sending a drive signal to the tension drive unit 214. Further, the overall control unit 210 controls the tensile force of each wire by controlling the driving torque of the motor, not limited to the winding operation. Further, the overall control unit 210 identifies the timing at which the affected leg switches from the standing leg state to the swinging leg state from the detected result of the load distribution sensor 222, increases or decreases the tensile force of each wire in synchronization with the timing and thus, assists in swinging the affected leg.

The harness drive unit 215 includes a motor and a drive circuit thereof that are for pulling the harness wire 111 provided in the harness tension portion 112. By sending a drive signal to the harness drive unit 215, the overall control unit 210 controls the winding of the harness wire 111 and the tensile force of the harness wire 111. For example, when the trainee 900 is predicted to fall, the overall control unit 210 winds a certain amount of the harness wire 111 to suppress the trainee from falling.

The image processing unit 216 is connected to the camera 140 and can receive an image signal from the camera 140. The image processing unit 216 receives an image signal from the camera 140 following the instruction from the overall control unit 210, and performs image processing on the received image signal to generate image data. Further, the image processing unit 216 can also perform image processing on the image signal received from the camera 140 following the instruction from the overall control unit 210 to execute a specific image analysis. For example, the image processing unit 216 detects the position of the foot (standing position) of the affected leg in contact with the treadmill 131 by image analysis. Specifically, for example, the standing position is calculated by extracting an image region near the tip of the foot flat frame 124 and analyzing an identification marker drawn on the belt 1311 that overlaps the tip portion.

As described above, the posture sensor 217 detects the inclination angle of the abdomen of the trainee 900 with respect to the gravity direction, and transmits the detection signal to the overall control unit 210. The overall control unit 210 calculates the posture of the trainee 900, specifically the inclination angle of the trunk of the body by using the detection signal from the posture sensor 217. The overall control unit 210 and the posture sensor 217 may be connected by wire or by short-range wireless communication.

The handrail sensor 218 detects the load applied to the handrail 130*a*. That is, the load of an amount of the trainee's weight that the trainee 900 cannot support with both legs is applied to the handrail 130*a*. The handrail sensor 218 detects this load and transmits a detection signal to the overall control unit 210.

As described above, the load distribution sensor 222 detects the magnitude and distribution of the surface pressure (load) received from the sole of the trainee 900 and transmits the detection signal to the overall control unit 210. The overall control unit 210 receives the detection signal and analyzes it to distinguish the walking state and estimate switching.

The overall control unit 210 also plays a role as a function execution unit that executes various operations and controls related to control. The overall control unit 210 includes, for example, a walking evaluation unit 210*a*, a training determination unit 210*b*, a walking state distinguishing unit 210*c*, a bending-extending control unit 210*d*, and a clearance measuring unit 210*e*.

The walking evaluation unit 210*a* evaluates whether the walking motion of the trainee 900 is abnormal walking by using the data acquired from various sensors. The training determination unit 210*b* determines the training result for a series of walking trainings based on, for example, the cumulative number of abnormal walking evaluated by the walking evaluation unit 210*a*.

The method for determining the training result and the criteria for determining the training result may be arbitrarily set. For example, the training result may be determined by comparing the amount of movement of the paralyzed body portion with the reference for each walking phase. The walking phase is one walking phase (one walking cycle) for the affected leg (or a healthy leg) classified into a standing leg phase in the standing leg state, a transition phase from the standing leg phase to a swinging leg phase in the swinging leg state, a swinging leg phase, and a transition phase from the swinging leg phase to the standing leg phase, and so on. The walking phase can be classified (determined) from, for example, the detected result by the load distribution sensor 222. As described above, the walking cycle can be treated as one cycle with the standing leg phase, the transition phase, the swinging leg phase, and the transition phase. However, it does not matter which phase is defined as the start phase. In addition, the walking cycle can be treated as one cycle with, for example, a both legs supported state, a single leg (affected leg) supported state, the both legs supported state, and a single leg (healthy leg) supported state, and in this case, it does not matter which state is defined as the starting state.

In addition, the walking phase focusing on the right leg or the left leg (healthy leg or affected leg) can be further subdivided. For example, the standing leg phase can be divided into an initial ground contact and four phases, and the swinging leg phase can be divided into the three phases. The initial ground contact refers to the moment when an observation foot touches the floor, and the four phases of the standing leg phase refer to a load response phase, a standing leg middle phase, a standing leg end phase, and a pre-swinging leg phase. The load response phase is the phase from the initial ground contact to the moment when the foot on the opposite side is off the floor (contralateral takeoff). The standing leg middle phase is the phase from the contralateral takeoff to the moment when the heel of the observation foot leaves the floor (heel takeoff). The standing leg end phase is the phase from the heel takeoff to the initial ground contact on the opposite side. The pre-swinging leg phase is the phase from the initial ground contact on the opposite side to the time when the observation foot leaves the floor (takeoff). The three phases of the swinging leg phase refer to a swinging leg initial phase, a swinging leg middle phase, and a swinging leg end phase. The swinging leg initial phase is the phase from the end of the previous swinging leg phase (the above-mentioned takeoff) to the time at which both feet cross (feet crossing). The swinging leg middle phase is the phase from the time at which the feet cross to the time at which the cervical spine becomes vertical (vertical cervical spine). The swinging leg end phase is the phase from the time at which the cervical spine is vertical to the next initial ground contact time.

The walking state distinguishing unit 210*c* distinguishes the walking state of the trainee 900 based on the load distribution of each leg detected by the load distribution sensor 222. For example, when the load that is received from one leg of the trainee 900 and that is detected by the load distribution sensor 222 changes from being less than a first threshold value to being equal to or more than the first threshold value, the walking state distinguishing unit 210*c* determines that the one leg has transitioned from the swinging leg state to the standing leg state, and when the load changes from being equal to or more than a second threshold value (first threshold value>second threshold value) to less than the second threshold value, the walking state distinguishing unit 210*c* determines that the one leg has shifted from the standing leg state to the swinging leg state. The walking state distinguishing unit 210*c* distinguishes not only the walking state of the healthy leg but also the walking state of the affected leg equipped with the walking assist device 120. In that case, the walking state distinguishing unit 210*c* distinguishes the walking state in consideration of the load of the walking assist device 120.

When it is determined that the affected leg equipped with the walking assist device 120 is in the swinging leg state, the bending-extending control unit 210*d* performs a predetermined bending-extending control for the swinging leg state of the affected leg by the walking assist device 120. Specifically, the bending-extending control unit 210*d* controls (assists) the bending of the affected leg by the walking assist device 120 at the swinging leg initial phase, and controls (assists) extending of the affected leg by the walking assist device 120 from the swinging leg middle phase to the swinging leg end phase. The additional function of the bending-extending control unit 210*d* and the clearance measuring unit 210*e* will be described later.

The communication connection IF 219 is an interface connected to the overall control unit 210, and is an interface for sending a command to the walking assist device 120 attached to the affected leg of the trainee 900 and receiving sensor information.

The walking assist device 120 can include a communication connection IF 229 that is connected to the communication connection IF 219 by a wire or wirelessly. The communication connection IF 299 is connected to the auxiliary control unit 220 of the walking assist device 120. The communication connection IF 219 and the communication connection IF 229 are communication interfaces such as a wired LAN or a wireless LAN that conform to the communication standard.

Further, the walking assist device 120 can include the auxiliary control unit 220, a joint drive unit 221, and the angle sensor 223. The auxiliary control unit 220 is, for example, an MPU, and controls the walking assist device 120 by executing the control program given by the overall control unit 210. Further, the auxiliary control unit 220 notifies the overall control unit 210 of the state of the walking assist device 120 via the communication connection IF 219 and the communication connection IF 229. Further, the auxiliary control unit 220 receives a command from the overall control unit 210 and executes control such as starting and stopping the walking assist device 120.

The joint drive unit 221 includes a motor and a drive circuit thereof of the control unit 121. By sending a drive signal to the joint drive unit 221, the auxiliary control unit 220 assists the upper leg frame 122 and the lower leg frame 123 so as to relatively open or close around the hinge axis Ha. Such movements assist the knee extension and bending movements and prevent knee breakage.

As described above, the angle sensor 223 detects the angle formed by the upper leg frame 122 and the lower leg frame 123 around the hinge axis Ha, and transmits the detection signal to the auxiliary control unit 220. The auxiliary control unit 220 receives this detection signal and calculates the opening angle of the knee joint.

Note that the trainee 900 does not always walk in the same way during walking training. For example, the trainee 900 may walk in a state in which the height of the leg while the leg is swinging is lower than usual. When the bending-extending control of the affected leg by the walking assist device 120 is performed without taking into consideration that the height of the affected leg equipped with the walking assist device (robot leg) 120 while the leg is swinging is lower than usual, the trainee 900 may trip over the belt 1311 during bending-extending control of the affected leg by the walking assist device 120, for example. Thus, the trainee 900 cannot perform effective walking training.

Figure 5:
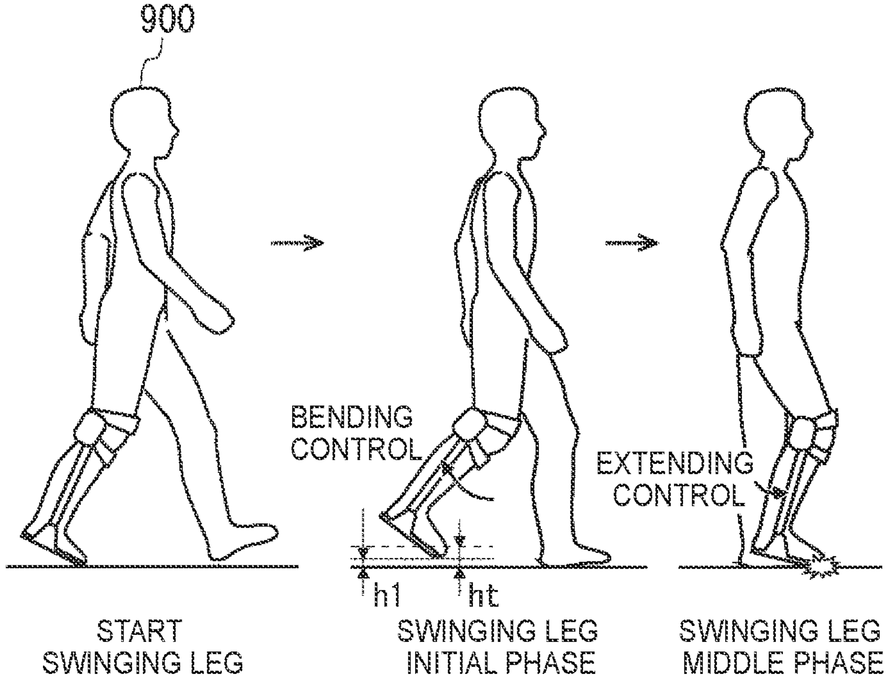
FIG. 5 is a diagram for describing a problem caused by a low position of a leg in a swinging leg state.

FIG. 5 is a diagram for explaining a problem caused by the leg height in the swinging leg state being lower than usual. In the example of FIG. 5, a case where the right leg is the affected leg to which the walking assist device 120 is attached and the left leg is a healthy leg will be described.

In the example of FIG. 5, the right leg bending control is performed by the walking assist device 120 from the start of swinging of the right leg to the swinging leg initial phase, and then the extending control of the right leg by the walking assist device 120 is performed from the swinging leg middle phase to the swinging leg end phase of the right leg. Here, in the example of FIG. 5, since a clearance h1 between the toe of the right leg and the belt 1311 is less than a specified value ht at the swinging leg initial phase of the right leg, when the extending control of the right leg by the walking assist device 120 in the swinging leg middle phase of the right leg is performed, the toe of the right leg may come into contact with the belt 1311. That is, the trainee 900 may stumble on the belt 1311. The specified value ht is the minimum clearance that should be secured in order for the trainee 900 to walk safely without stumbling on the belt 1311.

Therefore, in the present embodiment, first, the clearance measuring unit 210*e* measures the clearance h1 between the affected leg equipped with the walking assist device 120 and the belt 1311. Then, when the clearance h1 is equal to or more than the specified value ht, the bending-extending control unit 210*d* continues the predetermined bending-extending control for the normal time by the walking assist device 120, and when the clearance h1 is less than the specified value ht, the bending-extending control by the walking assist device 120 is changed to the control content for the abnormal time so that the affected leg does not come into contact with the belt 1311 during the swinging leg period. As a result, the walking training device 100 can prevent the trainee 900 from stumbling on the belt 1311, and thus can provide the trainee 900 with effective walking training.

The clearance measuring unit 210*e* may measure the clearance h1 from, for example, an image taken by a photographing device. At this time, the camera 140 may be used as the photographing device.

Alternatively, the clearance measuring unit 210*e* may measure the clearance h1 based on the degree of assistance of the walking assist device 120 by a leg relief device. For example, the clearance measuring unit 210*e* measures the clearance based on at least one of the length of a wire and the tension thereof when the leg relief device pulls the walking assist device 120 using the wire. At this time, the front tension portion 135 and the rear tension portion 137 may be used for the leg relief device.

In addition, the clearance measuring unit 210*e* may be a laser displacement meter that measures the clearance h1 by using a laser, or may be an ultrasonic sensor that measures the clearance h1 using ultrasonic waves.

(Example of Operation of Walking Training Device 100)

Figure 6:
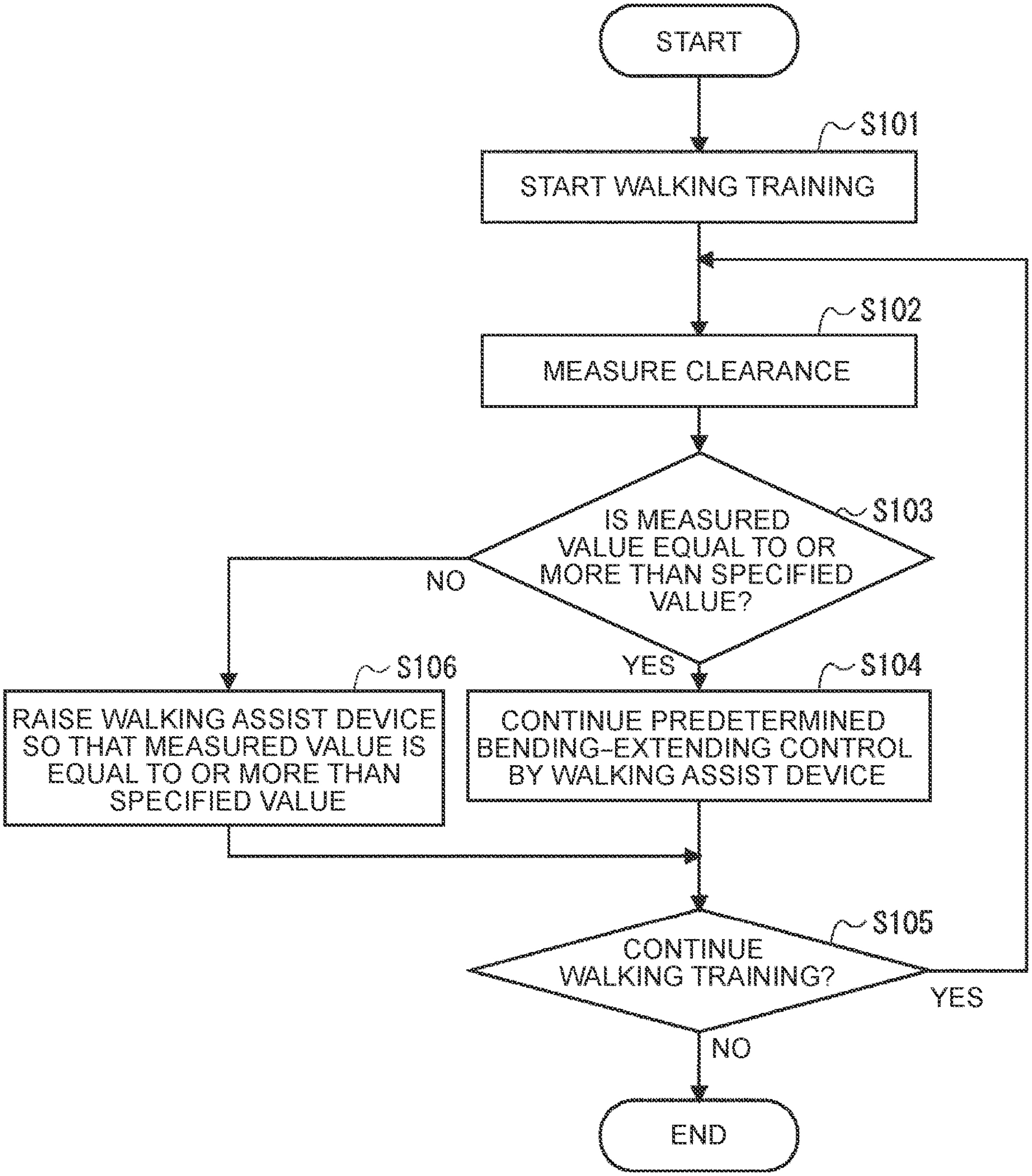
FIG. 6 is a flowchart showing an example of an operation of the walking training device shown in FIG. 1.
Figure 7:
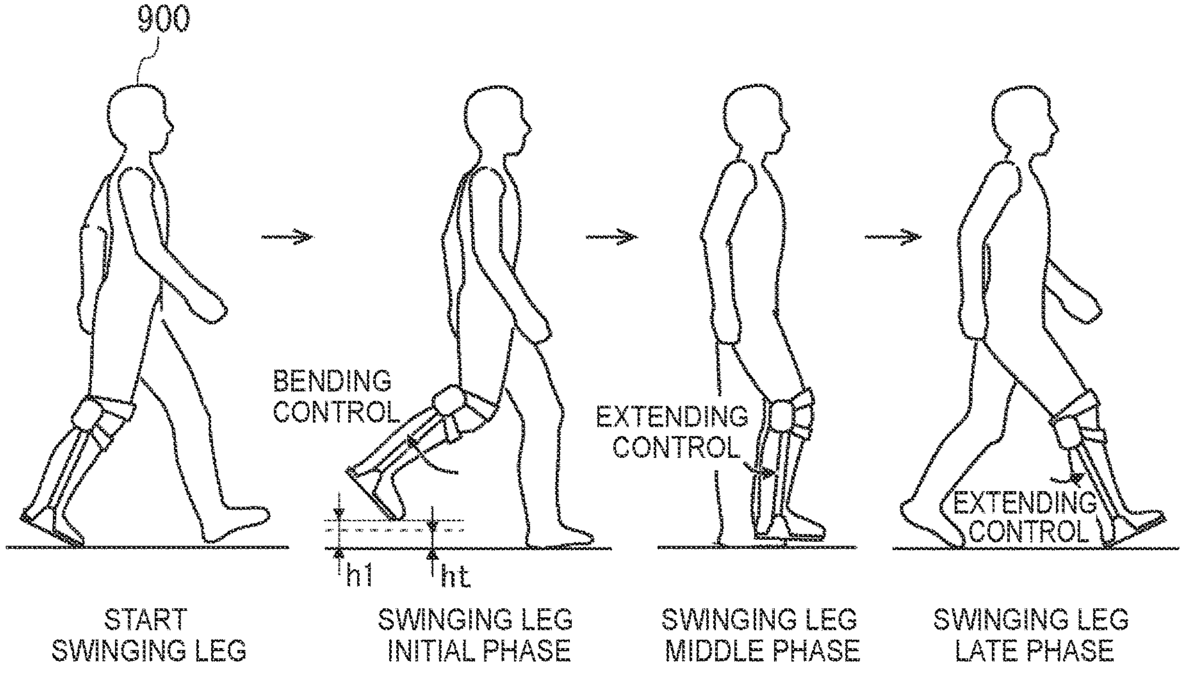
FIG. 7 is a diagram for describing the operation of the walking training device shown in FIG. 6.
Figure 8:
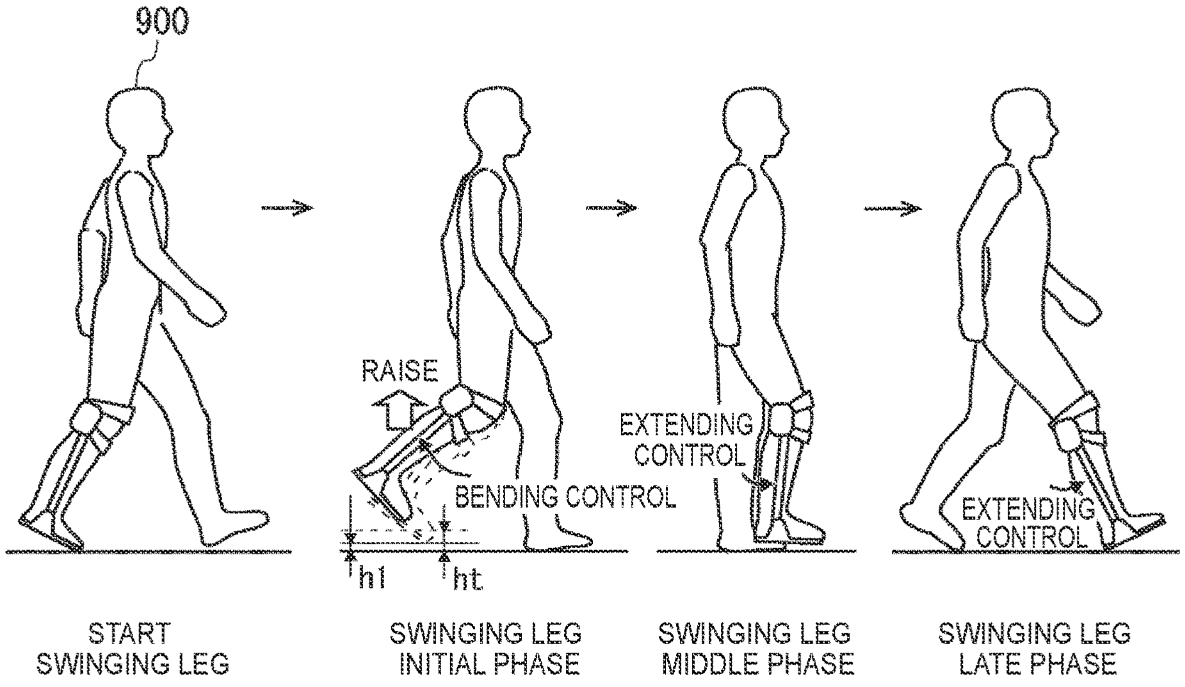
FIG. 8 is a diagram for describing the operation of the walking training device shown in FIG. 6.

FIG. 6 is a flowchart showing an example of the operation of the walking training device 100. FIGS. 7 and 8 are diagrams for describing the operation of the walking training device 100 shown in FIG. 6. In the example of FIGS. 6 to 8, a case where the right leg is the affected leg to which the walking assist device 120 is attached and the left leg is a healthy leg will be described.

First, the trainee 900 gets on the belt 1311 of the treadmill 131 and starts the walking training (step S101). During the walking training, the clearance measuring unit 210*e* measures the clearance h1 between the right leg equipped with the walking assist device 120 and the belt 1311 (step S102).

For example, when the clearance h1 is equal to or more than the specified value ht (YES in step S103), since it is unlikely that the trainee 900 will stumble on the belt 1311, the bending-extending control unit 210*d* makes the walking assist device 120 continue the predetermined bending-extending control for the normal time (step S104).

Referring to FIG. 7, since the clearance h1 between the toe of the right leg and the belt 1311 is equal to or more than the specified value ht at the swinging leg initial phase, the bending-extending control unit 210*d* makes the walking assist device 120 continue the predetermined bending-extending control for the normal time. As a result, the trainee 900 can walk safely without stumbling on the belt 1311.

In contrast, when the clearance h1 is less than the specified value ht (NO in step S103), since there is a high possibility that the trainee 900 will stumble on the belt 1311, the bending-extending control unit 210*d* changes the bending-extending control by the walking assist device 120 to the control content for the abnormal time (step S106).

Specifically, the bending-extending control unit 210*d* raises the walking assist device 120 so that the clearance h1 becomes equal to or more than the specified value ht (step S106). For example, the bending-extending control unit 210*d* may raise the walking assist device 120 by using the leg relief device, or may raise the walking assist device by additional bending control by the walking assist device 120.

Referring to FIG. 8, since the clearance h1 between the toe of the right leg and the belt 1311 is less than the specified value ht at the swinging leg initial phase, the bending-extending control unit 210*d* walks so that the clearance h1 is equal to or more than the specified value ht. After raising the walking assist device 120, the walking assist device 120 controls the bending and extending of the right leg. As a result, the trainee 900 can walk safely without stumbling on the belt 1311.

After that, when the walking training is continued, the process returns to the process of step S102 (YES in step S105), and when the walking training is not continued, the walking training ends (NO in step S105).

(Another Example of Operation of Walking Training Device 100)

Figure 9:
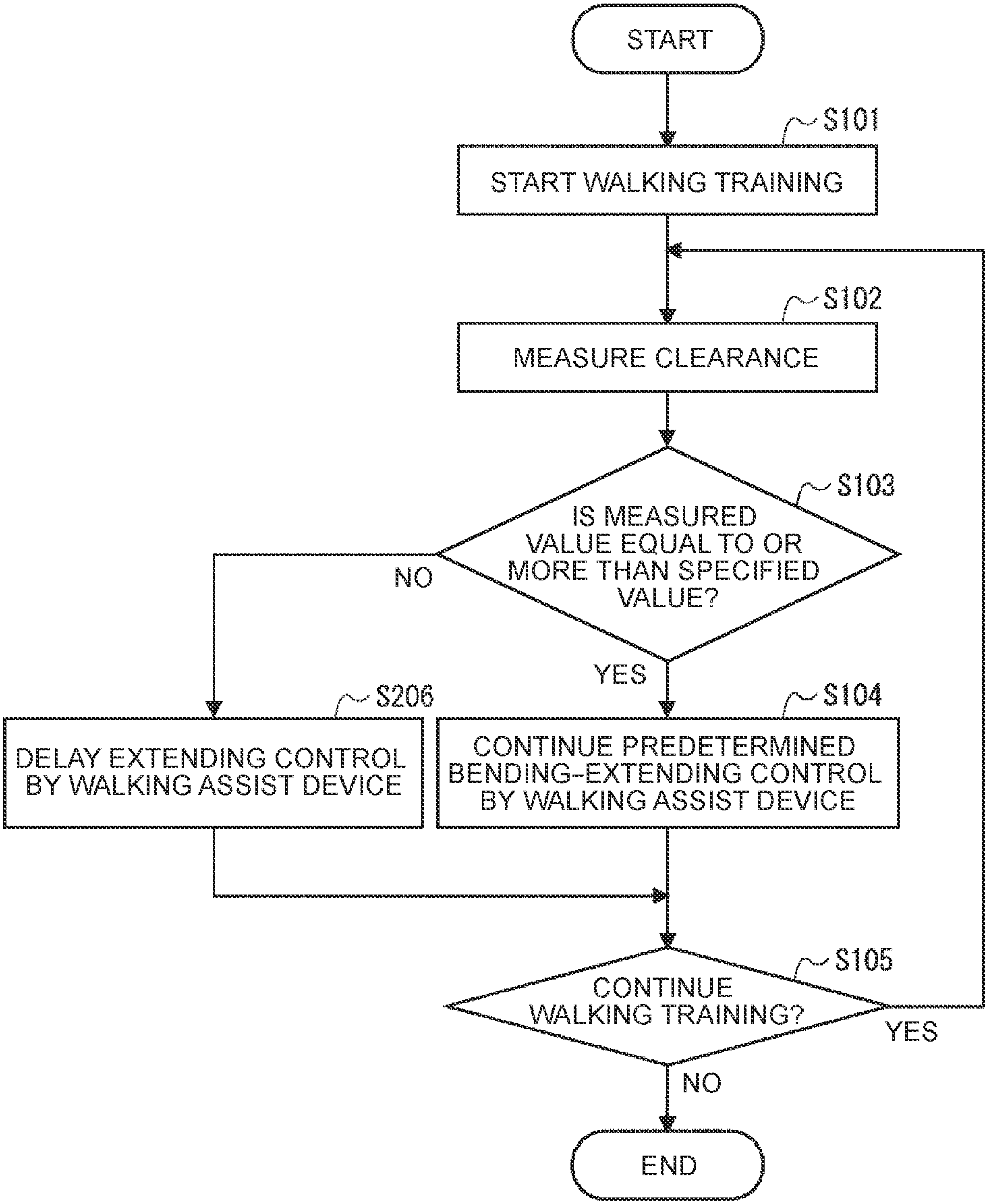
FIG. 9 is a flowchart showing another example of the operation of the walking training device shown in FIG. 1.
Figure 10:
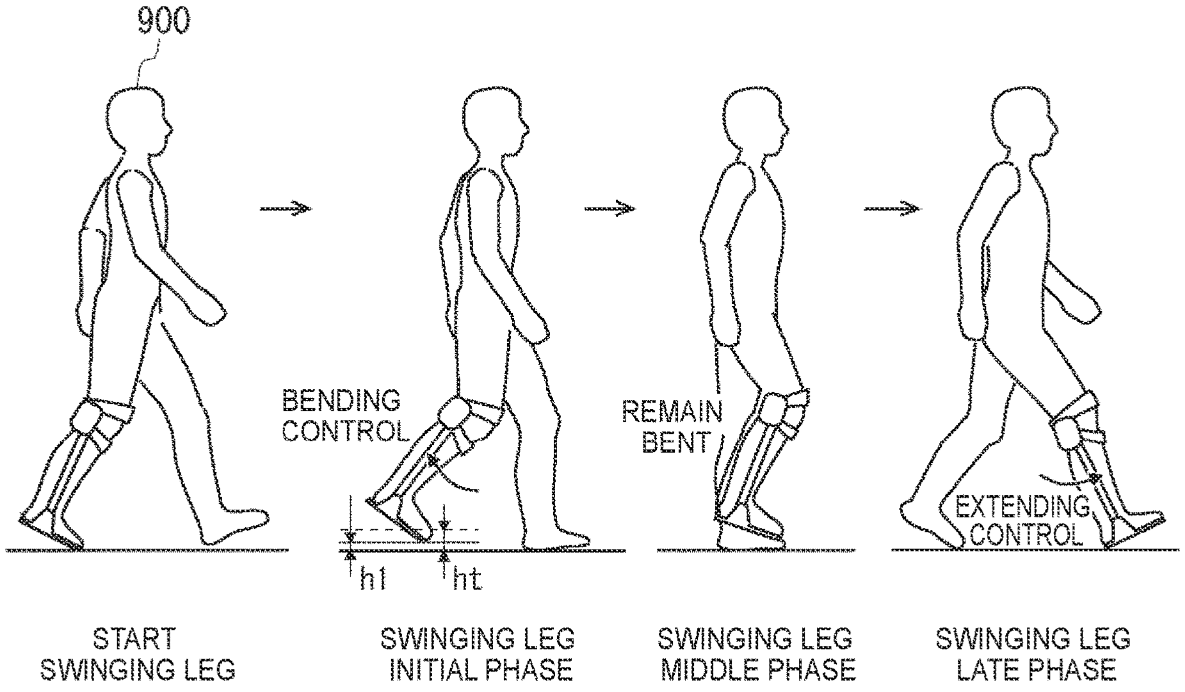
FIG. 10 is a diagram for describing the operation of the walking training device shown in FIG. 9.

FIG. 9 is a flowchart showing another example of the operation of the walking training device 100. FIG. 10 is a diagram for explaining the operation of the walking training device 100 shown in FIG. 9. In the example of FIGS. 9 and 10, a case where the right leg is the affected leg to which the walking assist device 120 is attached and the left leg is a healthy leg will be described. Further, in the following, content that is different from the content described in FIG. 6 will be mainly described.

For example, when the clearance h1 between the toe of the right leg of the trainee 900 in the swinging leg state and the belt 1311 is equal to or more than the specified value ht (YES in step S103), since it is unlikely that the trainee 900 will stumble on the belt 1311, the bending-extending control unit 210*d* makes the walking assist device 120 continue the predetermined bending-extending control for the normal time (step S104).

In contrast, when the clearance h1 is less than the specified value ht (NO in step S103), since there is a high possibility that the trainee 900 will stumble on the belt 1311, the bending-extending control unit 210*d* postpones the bending-extending control of the right leg by the walking assist device 120 (step S206).

Referring to FIG. 10, since the clearance h1 between the toe of the right leg and the belt 1311 is less than the specified value ht at the swinging leg initial phase, the bending-extending control unit 210*d* does not make the walking assist device 120 perform the extending control of the right leg in the swinging leg middle phase and starts the extending control at the swinging leg end phase. At this time, the bending-extending control unit 210*d* may reduce the extending speed of the right leg by the walking assist device 120. As a result, the trainee 900 can walk so that the toe of the right leg does not come into contact with the belt 1311 even when the clearance h1 is less than the specified value ht.

As described above, in the walking training device 100 in accordance with the present embodiment, when the clearance h1 is less than the specified value ht, the walking assist device 120 changes the bending-extending control of the affected leg by the walking assist device 120 to the control content for the abnormal time so that the affected leg does not come into contact with the belt 1311 during the swinging leg phase. As a result, the walking training device 100 can prevent the trainee 900 from stumbling on the belt 1311, and thus can provide the trainee 900 with effective walking training.

In the present embodiment, the case where the walking assist device 120 is attached to the right leg has been described as an example, but the present disclosure is not limited to this. For example, the walking assist device 120 may be attached to the left leg. Alternatively, the walking assist device 120 may be attached to each of the right leg and the left leg.

Further, in each of the above embodiments, the present disclosure has been described as a hardware configuration. However, the present disclosure is not limited thereto. The present disclosure can be realized by causing a central processing unit (CPU) to execute a computer program to control the walking training device 100.

The above-mentioned program can be stored and supplied to a computer using various types of non-transitory computer-readable media. The non-transitory computer-readable media include various types of tangible recording media. Non-temporary computer-readable media include, for example, magnetic recording media, opto-magnetic recording media, a CD-read only memory (ROM), a CD-R, a CD-R/W, and a semiconductor memory. The magnetic recording medium is, for example, a flexible disk, a magnetic tape, a hard disk drive, and the like. The opto-magnetic recording medium is, for example, an opto-magnetic disk. The semiconductor memory is, for example, a mask ROM, a programmable rom (PROM), an erasable PROM (EPROM), a flash ROM, a random access memory (RAM), and the like. Further, the program may be supplied to the computer using various types of transitory computer-readable media. Examples of the transitory computer-readable media include electrical signals, optical signals, and electromagnetic waves. The transitory computer-readable media can supply a program to a computer via a wired communication path such as an electric wire and an optical fiber, or a wireless communication path.

What is claimed is:

1. A walking training system comprising:

a robot leg configured to be attached to one leg of a trainee;

a treadmill;

a load distribution sensor that detects a distribution of a load received from a sole of the trainee riding on a belt of the treadmill;

a processor receiving signals from at least one sensor and executing computer readable instructions to determine whether at least the one leg is in a standing leg state or a swinging leg state, based on a detected result by the load distribution sensor;

the processor executing further instructions to perform a predetermined bending-extending control for the swinging leg state of the one leg by the robot leg when the processor determines that the one leg is in the swinging leg state; and the processor executing further instructions to measure, based on at least one sensor signal, a clearance between the one leg in the swinging leg state and the treadmill at a swinging leg initial phase in which the one leg is located behind another leg of the trainee, wherein when the clearance measured by the processor is less than the specified value, the processor-delays a start of the extending control of the one leg by the robot leg to a swinging leg end phase, which is from a time at which a cervical spine of the trainee is vertical to a next time the one leg touches a ground, by reducing an extending speed of the one leg, such that the one leg does not contact the belt of the treadmill during extending control of the one leg by the robot leg, wherein when the clearance measured by the processor is equal to or more than the specified value, the processor performs the extending control of the one leg in a swinging leg middle phase, which is from a time at which the one leg crosses the other leg to the time at which the cervical spine becomes vertical.

2. The walking training system according to claim 1, wherein when the clearance measured by the processor is less than the specified value, the control unit raises the robot leg such that the clearance is equal to or more than the specified value.

3. The walking training system according to claim 1, wherein the processor measures the clearance from a captured image of a photographing device that photographs the trainee during walking training.

4. The walking training system according to claim 1, wherein the processor measures the clearance based on at least one of a length of a wire and a tension of the wire when a leg relief device that assists an operation of the robot leg pulls the robot leg using the wire.

5. The walking training system according to claim 1, wherein the at least one sensor comprises a laser displacement meter that measures the clearance using a laser.

6. The walking training system according to claim 1, wherein the at least one sensor comprises an ultrasonic sensor that measures the clearance using ultrasonic waves.

7. A control method of a walking training system, the control method comprising:

a step of detecting a distribution of a load received from a sole of a trainee riding on a belt of a treadmill by using a load distribution sensor;

a step of determining whether at least one leg to which a robot leg is attached is in a standing leg state or a swinging leg state, based on a detected result by the load distribution sensor;

a step of performing a predetermined bending-extending control for the swinging leg state of the one leg by the robot leg when it is determined that the one leg is in the swinging leg state;

a step of measuring a clearance between the one leg in the swinging leg state and the treadmill at a swinging leg initial phase in which the one leg is located behind another leg of the trainee; and wherein when the clearance measured is less than the specified value, performing a step of delaying a start of the extending control of the one leg by the robot leg to a swinging leg end phase, which is from a time at which a cervical spine of the trainee is vertical to a next time the one leg touches a ground, by reducing an extending speed of the one leg, such that the one leg does not contact the belt of the treadmill during extending control of the one leg by the robot leg, and when the clearance measured is equal to or more than the specified value, performing a step of extending control of the one leg in a swinging leg middle phase, which is from a time at which the one leg crosses the other leg to the time at which the cervical spine becomes vertical.

8. A non-transitory computer readable medium storing a program that causes a computer to execute:

a process of detecting a distribution of a load received from a sole of a trainee riding on a belt of a treadmill by using a load distribution sensor;

a process of determining whether at least one leg to which a robot leg is attached is in a standing leg state or a swinging leg state, based on a detected result by the load distribution sensor;

a process of performing a predetermined bending-extending control for the swinging leg state of the one leg by the robot leg when it is determined that the one leg is in the swinging leg state;

a process of measuring a clearance between the one leg in the swinging leg state and the treadmill at a swinging leg initial phase in which the one leg is located behind another leg of the trainee; and when the clearance measured is less than the specified value, a process of delaying a start of the extending control of the one leg by the robot leg to a swinging leg end phase, which is from a time at which a cervical spine of the trainee is vertical to a next time the one leg touches a ground, by reducing an extending speed of the one leg, such that the one leg does not contact the belt of the treadmill during extending control of the one leg by the robot leg, and when the clearance measured is equal to or more than the specified value, a process of extending control of the one leg in a swinging leg middle phase, which is from a time at which the one leg crosses the other leg to the time at which the cervical spine becomes vertical.

9. The walking training system of claim 1, wherein the processor receives a level of assistance, and when the level of assistance is set to a minimum, a front wire of a leg relief device that assists an operation of the robot leg provides a force sufficient to cancel a weight of the robot leg in accordance with a swing timing of the one leg.

10. The walking training system of claim 1, wherein the processor distinguishes and adjusts a rotation speed of the belt of the treadmill in accordance with a walking state of the one leg.

11. The walking training system of claim 1, wherein the processor determines a training result for a series of walking trainings based on an accumulative number of abnormal walking, the abnormal walking being a case in which the clearance measured by the processor is less than the specified value.

12. The walking training system of claim 1, wherein the processor determines a training result by comparing an amount of movement of the one leg with reference for each walking phase determined by the processor.

13. The walking training system of claim 1, wherein the processor further performs a bending control of the one leg at the swinging leg initial phase.

* * * * *